US009821732B2

United States Patent
Birner et al.

(10) Patent No.: US 9,821,732 B2
(45) Date of Patent: Nov. 21, 2017

(54) COVER FOR PLACEMENT IN A FRONT/REAR COMPARTMENT OF A MOTOR VEHICLE

(71) Applicant: Bayerische Motoren Werke Aktiengesellschaft, Munich (DE)

(72) Inventors: Stefan Birner, Landshut (DE); Anja Maier, Zolling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/939,492

(22) Filed: Nov. 12, 2015

(65) Prior Publication Data

US 2016/0059798 A1 Mar. 3, 2016

Related U.S. Application Data

(63) Continuation of application No. PCT/EP2014/058705, filed on Apr. 29, 2014.

(30) Foreign Application Priority Data

May 13, 2013 (DE) .................. 10 2013 208 741
Jun. 26, 2013 (DE) .................. 10 2013 212 203

(51) Int. Cl.
*B60R 13/08* (2006.01)

(52) U.S. Cl.
CPC ...... *B60R 13/0838* (2013.01); *B60R 13/0869* (2013.01); *B60R 13/0884* (2013.01)

(58) Field of Classification Search
CPC ..... B60R 13/04; B60R 13/08; B60R 13/0838; B60R 13/0884; B60R 13/0869
USPC ...................... 296/1.07, 1.08, 39.3
See application file for complete search history.

(56) References Cited

U.S. PATENT DOCUMENTS 5,589,242 A * 12/1996 Stief ................... B60R 13/0838
181/198
5,958,603 A * 9/1999 Ragland .................. B60R 13/08
428/595
8,887,850 B2 * 11/2014 Schaefer ................. B60R 13/08
123/195 E
2006/0065474 A1 3/2006 Niwa et al.
(Continued)

FOREIGN PATENT DOCUMENTS

| CN | 201042948 Y | 4/2008 |
| CN | 102529841 A | 7/2012 |
| DE | 82 11 797 U1 | 10/1982 |

(Continued)

OTHER PUBLICATIONS

English translation of DE 10 2004 007 602; retrieved on Dec. 16, 2016 via PatentTranslate located at www.epo.gov.*
(Continued)

*Primary Examiner* — Jason S Daniels
(74) *Attorney, Agent, or Firm* — Crowell & Moring LLP

(57) ABSTRACT

A cover is provided for placement in a front/rear compartment of a motor vehicle. The cover is substantially made up of a frame and a covering attached to the frame. The covering is formed from a thin, flexible, in particular, skin-like material. The cover can be mounted in the front/rear compartment such that the covering covers at least one section of the front/rear compartment and/or one component situated therein.

20 Claims, 1 Drawing Sheet

(56) References Cited

U.S. PATENT DOCUMENTS

2012/0152929 A1  6/2012  Hintennach

FOREIGN PATENT DOCUMENTS

| | | |
|---|---|---|
| DE | 42 28 549 A1 | 10/1993 |
| DE | 195 43 355 A1 | 5/1997 |
| DE | 197 27 510 A1 | 1/1999 |
| DE | 199 30 762 A1 | 12/1999 |
| DE | 101 21 683 A1 | 11/2002 |
| DE | 103 43 245 A1 | 4/2005 |
| DE | 10 2004 007 602 A1 | 9/2005 |
| JP | 2011-231598 A | 11/2011 |

OTHER PUBLICATIONS

International Search Report (PCT/ISA/210) issued in counterpart International Application No. PCT/EP2014/058705 dated Jun. 27, 2014, with English translation (Eight (8) pages).
German Search Report issued in counterpart German Application No. 10 2013 212 203.9 dated Dec. 16, 2013, with English translation (Ten (10) pages).
Chinese Office Action issued in counterpart Chinese Application No. 201480026981.5 dated Aug. 15, 2016 with English translation (13 pages).

* cited by examiner

COVER FOR PLACEMENT IN A FRONT/REAR COMPARTMENT OF A MOTOR VEHICLE

CROSS REFERENCE TO RELATED APPLICATIONS

This application is a continuation of PCT International Application No. PCT/EP2014/058705, filed Apr. 29, 2014, which claims priority under 35 U.S.C. §119 from German Patent Application No. 10 2013 208 741.1, filed May 13, 2013 and German Patent Application No. 10 2013 212 203.9, filed Jun. 26, 2013, the entire disclosures of which are herein expressly incorporated by reference.

BACKGROUND AND SUMMARY OF THE INVENTION

The present invention relates to a cover for placement in a front compartment and/or a rear compartment of a motor vehicle.

It is common practice for newer vehicles to install covers, for example, in a front engine compartment. Lying below the cover may be, for example, various components such as drive assemblies, operating devices, tanks, or electrical or electronic components. For example, when a front hood of the vehicle is open, such a cover covers the components lying below. In addition to a merely aesthetic function, such a cover often also functions as an acoustic and/or thermal insulator. Such a cover is, for example, embodied as a single plastic injection molded part or as a multilayered sandwich component, and, for example, one or a plurality of layers provides the component with a certain stiffness or rigidity and one or a plurality of other layers serves as the insulation.

Henceforth, it is the object of the present invention to create a cover for placement in a front/rear compartment of a motor vehicle which respectively visually covers the components situated in the front/rear compartment without unnecessarily increasing the weight of the vehicle.

This and other objects are achieved according to the invention by a cover for placement in a front/rear compartment of a motor vehicle, which cover substantially is made up of a frame and a covering attached to the frame. The covering is formed from a thin, flexible, in particular, skin-like material. The cover can be installed in the front/rear compartment in such a manner that the covering covers at least one section of the front/rear compartment and/or one component situated therein.

Owing to this architecture of the cover, in which merely the frame covered with the thin material is used, the cover is significantly more lightweight than a conventional cover, which is manufactured from a plate-like material. The cover according to the present invention may particularly be used in motor vehicles having a small range, for example, electric vehicles, since, in this instance, a reduction in weight also enables an increase in range and a lightweight construction is of particular importance in these vehicles. The present invention, however, may also be used in motor vehicles having a combustion engine because a lightweight design here also becomes increasingly important owing to increasing energy prices. Further, the cover according to the present invention may provide a more visually or optically appealing and tidy design for the interior of a front/rear compartment of a motor vehicle. In other words, the cover according to the present invention is substantially also a design element, which enhances the front compartment and/or the rear compartment of the motor vehicle. The cover is, in particular, visible when the front/rear compartment of the motor vehicle is open, that is, when a front hood or a rear hood of the motor vehicle is open. The front compartment of the motor vehicle is located in a so-called front end of the motor vehicle and the rear compartment is located in a so-called rear end of the motor vehicle. The occupant compartment is located between the front end and the rear end.

According to a preferred further refinement, the covering may be designed in an opaque, a completely translucent or a partially translucent manner.

Preferably, the covering of the cover of the present invention is made up of a textile, for example, a flat textile structure. Such a textile may be a woven, knitted, or crocheted fabric, a nonwoven or a felt. Alternatively, the covering may also be formed from a foil. For a covering which is heavily used, it may also be possible to combine a textile and a foil.

The textile and/or the foil are able to be designed in a particularly lightweight manner per unit area since the covering made of these materials may be designed very thinly. Furthermore, both the textile and the foil have a variety of visual design possibilities.

Preferably, the textile is made up of mineral natural fibers, for example, mineral wool, and/or vegetable natural fibers, for example, cotton, hemp or flax fibers, and/or animal natural fibers, for example, wool and silk. Further, the fibers may additionally or alternatively be made up of chemical fibers, for example, natural polymers and/or synthetic polymers. Further, the fibers may also be made up of metal or other inorganic fibers, for example, glass.

Preferably, the component to be covered is a drive assembly, for example, an engine, a fuel cell, a combustion engine, a transmission or an ancillary unit connected thereto, for example, a fuel pump, an air conditioning unit or the like. The component to be covered may also be an operating device reservoir or an operating device compensation tank, for example, for a cooling liquid, windshield washer fluid, brake fluid and the like. Further, the cover may also cover electronic or electrical control components. Further, the component to be covered may also be, for example, a wiring harness, a gas/fluid line, a headlight housing or the like.

The cover may also be designed as a cover of a subjacent storage compartment. Such a storage compartment may, for example, be for a tool, a towing aid, a spare tire, safety equipment, etc.

According to a preferred further development, the covering is clamped, glued and/or welded to the frame. For example, the covering may be clamped or clipped or, for example, also glued between a frame bottom part and a frame top part. In doing so, a particularly simple connection between the covering and the frame is provided.

Furthermore, the frame may be manufactured from a plastic, in particular, from a fiber-reinforced plastic. Alternatively or in addition, the frame may be formed from a metallic material, for example, a light metal. In this instance, a stiffness or rigidity of the frame may only be chosen in such a manner that the frame reliably holds the covering.

The covering may be designed in such a manner that it only forms a visible shield. In this instance, the covering, in particular for a textile covering but also for a foil, may be designed more or less translucent or it may be designed completely opaque. In addition or alternatively, the covering may also be designed as a shield against pollution of the components lying below or of the front/rear compartment by the subjacent components.

Preferably, the frame has fasteners for releasably mounting the frame in the front/rear compartment. The fasteners may, for example, be a Velcro fastener, a screw connection (or another threaded connector) or a releasable clip connection. In particular, a mounting flange may be attached to the frame.

In doing so, the covering may be designed so that it may be quickly released and be quickly reattached so that access to the subjacent components is possible in a respectively quick and easy manner.

Further, the frame may be particularly made up out of a completely or partially surrounding outer frame forming an outer edge of the covering. In addition, the frame may be designed to also have a cover opening within the outer edge of the cover. Such a cover opening may, for example, be designed in such a manner that access to the subjacent component is enabled without removing the cover. In particular, a filling connector of an operating device tank could be opened or locked via the cover opening without requiring the removal of the cover from the front/rear compartment.

In addition to the outer frame, the frame may also have stiffening connecting frame elements or cross braces which connect the outer frame and, if applicable, also the cover opening, if provided, with each other. Such connecting frame elements may also be designed for supporting the covering and/or deflecting the covering if the cover is not completely situated in one plane.

Preferably, the cover is not designed as a thermally insulating element and/or a sound insulating element. This is particularly advantageous if the cover has a merely optical function and/or a function to shield from pollution and, for this reason, may be designed in a more lightweight manner than an insulating cover.

Other objects, advantages and novel features of the present invention will become apparent from the following detailed description of one or more preferred embodiments when considered in conjunction with the accompanying drawings.

DETAILED DESCRIPTION OF THE DRAWINGS

An exemplary embodiment of the present invention is subsequently described in reference to FIGS. 1 through 3.

Figure 1:
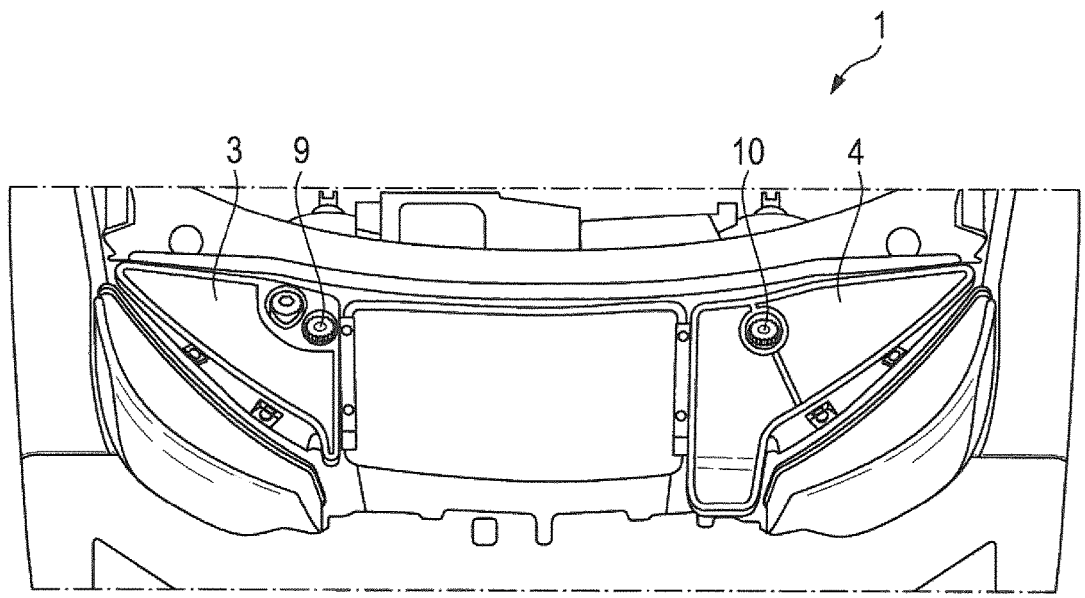
FIG. 1 is a schematic plan view onto a front compartment of a motor vehicle according to a preferred exemplary embodiment of the present invention.
Figure 2:
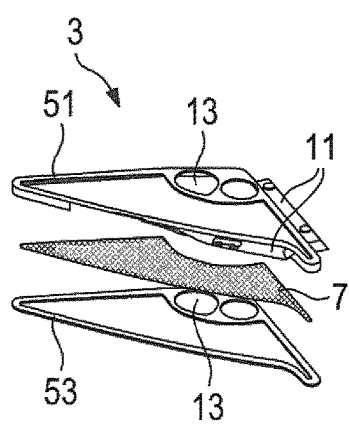
FIG. 2 is a schematic perspective exploded view of a right cover according to the exemplary embodiment of the present invention.

FIG. 1 shows a plan view onto an opened front equipment compartment 1 of a motor vehicle which is closeable by a front hood (not shown). A right cover 3 and a left cover 4 are situated in the front equipment compartment 1. For example, a compensation tank for a brake fluid and its filling socket 9 are, among other things, located below right cover 3. Located below left cover 4 are, for example, a compensation tank for a windshield washing fluid and its filling socket 10, among other things. Furthermore, a compensation tank for cooling fluid, cooling means lines, wiring harnesses and headlights housings are situated below covers 3 and 4.

Cover 3 is made up of a frame 5 and a covering 7, which is manufactured from a woven textile. Frame 5 forms a surrounding, closed, outer edge of cover 3. Frame 5 is made up of an upper frame part 51 and a bottom frame part 53. Covering 7 is, in a state of the upper frame part 51 and bottom frame part 53 being joined together, clamped between two frame parts 51, 53 and is, in addition, glued. In doing so, frame 5 and covering 7 form an assembly. Further, frame 5 has fasteners 11 in form of mounting flanges. Mounting flanges 11 have, for example, mounting holes via which right cover 3 may be attached in front equipment compartment 1 of the motor vehicle. Alternatively, a part of a Velcro fastener may be mounted to the flange. Further, two openings 13, which are cover openings according to the present invention, are directly formed in frame 5, particularly in upper frame part 51 and in bottom frame part 53. Openings 13 are directly formed in the outer edge of cover 3 and, for this reason, in the outer surrounding frame 5. Opening 13 enables access to filling socket 9 of the brake fluid compensation tank and to a further filling socket of, for example, the cooling fluid compensation tank of an air conditioner. In doing so, the filling sockets may be opened without having to release cover 3 from front equipment compartment 1.

Right cover 3 is designed substantially flat.

Figure 3:
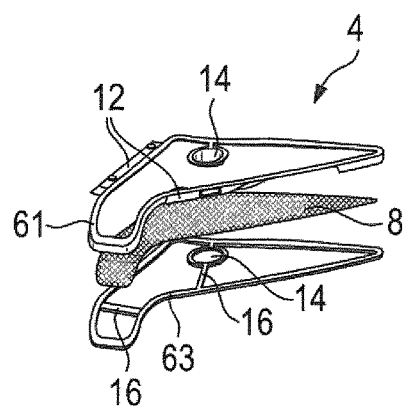
FIG. 3 is a schematic perspective exploded view of a left cover according to the exemplary embodiment of the present invention.

Left cover 4 is, in principal, constructed similarly to right cover 3, as it can be seen in the exploded view of FIG. 3. In particular, the left cover also has a frame 6 and a covering 8. Covering 8 is clamped and glued between an upper frame element 61 and a bottom frame element 63 so that they form an assembly. Like right cover 3, left cover 4 has mounting flanges 12 for attachment in front equipment compartment 1 of the motor vehicle. Further, an opening 14 is formed in frame 6, which illustrates a cover opening according to the present invention. The frame of opening 14 is, for reasons of stability, connected via a bridge 16 to the outer, opposite lying frame.

Further, a further bridge 16 is provided by which the covering is deflected downwards. Thus, left cover 4 is, in contrast to right cover 3, not designed in a flat manner but is curved downwards at its front end.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cover to be placed in a front or rear compartment of a motor vehicle, the cover comprising:
   a frame, the frame comprising an outer frame configured to form an outer edge of the cover; and
   a covering attached only at edges to the frame, wherein the covering is formed of a non-layered and thin, flexible material, and
   the cover is configured such that, when integrated into the front or rear compartment of the motor vehicle, the covering covers at least one section of the front or rear compartment and at least one component arranged in the front or rear compartment.

2. The cover according to claim 1, wherein the thin, flexible material of the covering is a textile material.

3. The cover according to claim 2, wherein the textile material is a woven, knitted, or crocheted fabric, a non-woven or a felt.

4. The cover according to claim 1, wherein the thin, flexible material of the covering is a foil.

5. The cover according to claim 2, wherein the textile is formed of one or more of mineral natural fibers, vegetable fibers, animal natural fibers, natural polymers, synthetic polymers, metallic fibers and inorganic fibers.

6. The cover according to claim 1, wherein the cover is configured for the front or rear compartment of the motor vehicle in order to cover one or more of a drive assembly, an ancillary unit, an operating device reservoir, an electronics/electrical control component, a wire, a fluid line, a headlight housing, a storage compartment, and a structural component.

7. The cover according to claim 1, wherein the covering is attached to the frame via one or more of a clamp, a glued connection and a welded connection.

8. The cover according to claim 7, wherein the frame comprises a top frame part and a bottom frame part, the covering being fastened between the top frame part and the bottom frame part.

9. The cover according to claim 1, wherein the frame is formed of a plastic or metallic material.

10. The cover according to claim 9, wherein the frame is a fiber-reinforced plastic frame.

11. The cover according to claim 1, wherein the covering is designed to be at least partially translucent or completely opaque.

12. The cover according to claim 1, wherein the covering is designed to provide a pollution shield.

13. The cover according to claim 1, wherein the frame comprises fasteners for releasably mounting the frame in the front or rear compartment.

14. The cover according to claim 13, wherein the fasteners comprise one or more of a Velcro fastener, a screw connector and a clip connection.

15. The cover according to claim 1, wherein the frame is configured to form both the outer edge of the cover and an edge of a cover opening within the cover, and
wherein the cover opening is configured to enable access to a subjacent component.

16. The cover according to claim 15, wherein the subjacent component is a filling socket by which a reservoir may be filled without having to remove the cover from the front or rear compartment.

17. The cover according to claim 1, wherein the frame comprises the outer frame and stiffening elements arranged within the outer frame.

18. An end region of a motor vehicle, comprising:
a front or a rear compartment of the motor vehicle;
a component arranged in the front or rear compartment, the component being one of a drive assembly, an ancillary unit for the drive assembly, an operating reservoir, an electrical control unit, a wire or fluid line, a headlight housing, or a storage compartment;
a cover configured for the front or rear compartment, wherein the component is subjacent the cover;
the cover comprising a frame and a covering attached only at edges to the frame, wherein
the frame comprises an outer frame configured to form an outer edge of the cover,
the covering is formed of a non-layered and thin flexible material and is arranged in the frame so as to cover the subjacent component in the front or rear compartment.

19. The end region according to claim 18, wherein the covering is a textile material or a foil.

20. The end region according to claim 19, wherein the frame is configured to form both the outer edge of the cover and an edge of a cover opening within the cover, and
wherein the cover opening is configured to enable access to a subjacent component.

* * * * *